A. BOERNER.
AIRCRAFT FUSELAGE.
APPLICATION FILED JUNE 22, 1920.
1,402,736. Patented Jan. 10, 1922.
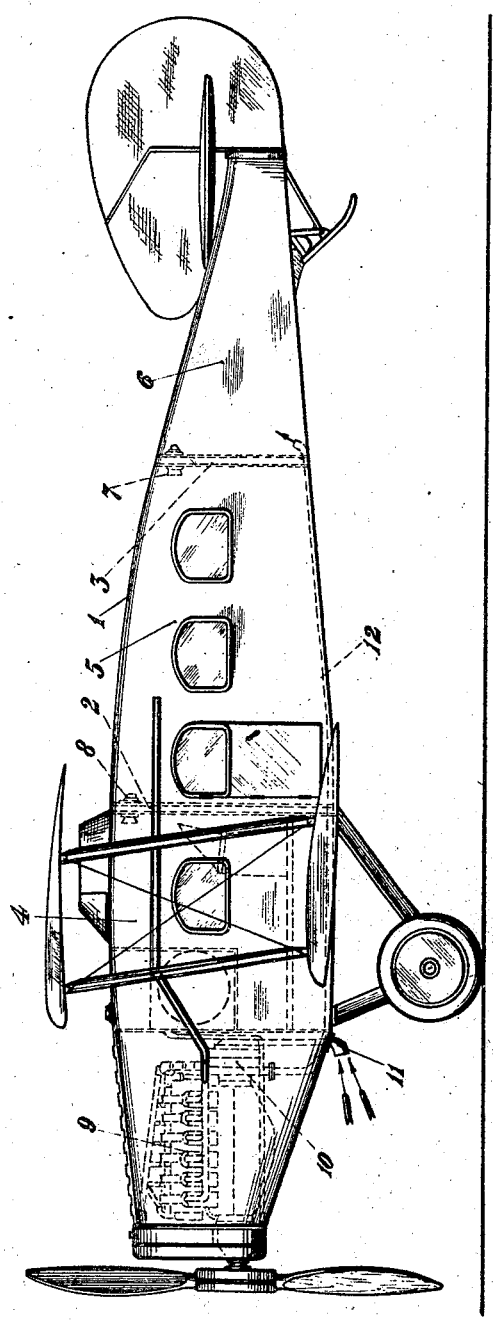

UNITED STATES PATENT OFFICE.

ARNO BOERNER, OF SCHEVENINGEN, NETHERLANDS.

AIRCRAFT FUSELAGE.

1,402,736.  Specification of Letters Patent.  Patented Jan. 10, 1922.

Application filed June 22, 1920. Serial No. 390,696.

*To all whom it may concern:*

Be it known that I, ARNO BOERNER, having no nationality, residing at Scheveningen, Netherlands, have invented certain new and useful Improvements in Aircraft Fuselages, of which the following is a specification.

The reduction in the pressure of the atmosphere with the increased height above the earth creates, as is well known, an uncomfortable and in many cases an injurious action on the human organs, particularly when this reduced pressure acts for a protracted period of time. Above a certain height for example natural breathing is impossible altogether. Hitherto attempts have been made to overcome this difficulty by carrying an oxygen apparatus when making flights at great altitudes, in order to assist respiration. Apart from the fact that the carrying of such apparatus on board means an undesirable load for the aircraft it is clear that this remedy is only capable of partially obviating the above mentioned injurious influences. Its chief disadvantage is that the entire body of the persons on board the aircraft is subjected to a very low external pressure which cannot be obviated by such apparatus. One object of this invention among others is to effect an improvement in this latter respect.

According to my invention this object can be obtained by maintaining within the fuselage of the aircraft a constant or practically constant pressure (or constant or practically constant pressures also in different compartments of the fuselage) by making the body airtight or practically airtight. A simple way of doing this for example is to provide the windows, doors and hatchways of the fuselage with indiarubber packing, which closes from inwards outwards, so that the packing surfaces are pressed with the greater force on to each other as the pressure in the interior of the body of the aircraft exceeds that of the surrounding atmospheric pressure.

In order to maintain the necessary air in an aircraft fuselage hermetically closed in this way, air may be fed according to this invention from the fuselage of the aircraft as air to support combustion for the engine and the rarefaction of the air caused thereby equalized by the admission of previously compressed air from outside. This has the important advantage that the fresh air admitted to the body of the aircraft is warmed by the compression thereof and the more so as the difference of pressure outside and inside the body of the aircraft is the greater. In this way it is possible to arrange a comfortable temperature inside the body of the aircraft.

If it be assumed that the compression of the air (which may be effected by a centrifugal compressor mounted on the engine) takes place adiabatically and if the pressure, volume and absolute temperature of a certain quantity of external air, and the compressed air obtained therefrom respectively, be denoted by $p_1$, $v_1$, and $T_1$ and by $p_2$, $v_2$ and $T_2$ respectively then $p_1.v_1 = R.T_1$ or $p_2.v_2 = R.T_2$ and consequently $$T_2 = T_1 \frac{p_2 \cdot v_2}{p_1 \cdot v_1}$$

Furthermore:

$$p_1.v_1^k = p_2.v_2^k;$$

therefore $$v_2 = \left(\frac{p_1}{p_2}\right)^{\frac{1}{k}} \left[k = \frac{c_p}{c_v} : \text{for air } k = 1,4\right]$$

and $$T_2 = T_1 \left(\frac{p_2}{p_1}\right)^{\frac{k-1}{k}}$$

At a height of 5000 metres the air pressure is equal at 0° C. to a column of mercury of 417 mm. At a compression to 760 mm. of mercury therefore $$T_2 = T_1 \left(\frac{p_2}{p_1}\right)^{\frac{k-1}{k}} = 273 \cdot \left(\frac{760}{417}\right)^{\frac{1.4-1}{1.4}} = 273(1.8)^{0.226}$$
$$= 317 = 44° \text{ Cels.}$$

Even if the loss of heat amounts to more than 50 per cent., which is decidedly too high in view of the rapid flow of the air through the body of the aircraft, the increase in the temperature of the air yet amounts to at least 20° Cels.

The accompanying drawing shows in side elevation an aeroplane in the fuselage of which a constant air pressure can be maintained in the manner above described.

The fuselage 1 which must be considered as being entirely airtight and through the walls of which the movable parts projecting outwards pass through stuffing boxes, is divided by two airtight partitions 2 and 3 into three compartments 4, 5 and 6. The compartment 4 contains the engine 9 and provides accommodation for the pilot and the mechanic or mechanics. Compartment 5 is the passenger compartment while compartment 6 serves as a reservoir for the compressed air. In the partition 3 is placed a reducing valve 7 in the partition 2 a reducing valve 8. On the shaft of the engine 9 is mounted a centrifugal air compressor 10 the suction pipe of which projects with a trumpet-like mouthpiece 11 in a forward direction form the fuselage 1. The discharge pipe 12 of the compresser opens into the chamber 6.

The reducing valve 7 opens towards the side of the compartment 5 as soon as the pressure of the air in the chamber 6 has become somewhat higher than 1 atmosphere, e. g. 1.1 atmosphere. In like manner air flows from the compartment 5 through the reducing valve 8 into compartment 4 as soon as the pressure therein drops say by 0.1 atmospheres below that in compartment 5. As the engine draws its air for combustion from compartment 4, there is produced in this latter compartment a reduction of the air pressure which however is immediately equalized from chamber 5. In like manner a reduction of the air pressure in compartment 5 is at once equalized by the admission of air from chamber 6. In this way a continuous replacement of the air inside the body of the aircraft is ensured and in such a way that compartment 5 always receives clean warmed outer air at about normal atmospheric pressure, and the air which is still capable of being used for respiration flows into compartment 4 from compartment 5.

The arrangement described has also the advantage that the motor of the aircraft always draws in air at about atmospheric pressure and that its efficiency is therefore not reduced by the increasing height of the air craft and the diminishing pressure of the atmospheric air.

Having now particularly described and ascertained the nature of my said invention and in what manner the same is to be performed, I declare that what I claim is:—

1. In an aircraft machine, the combination with the body closed airtight, of airtight partitions dividing the said body into compartments, means for delivering compressed air to one of the said compartments, and a reducing valve in each partition for admitting air at substantially constant pressure from the said compressed air containing compartment to the other compartments.

2. In an aircraft machine, the combination with the body closed airtight, of airtight partitions dividing the said body into compartments, an air compressor in one of the said compartments having its suction inlet open to the outside air and its delivery outlet terminating in another compartment for delivering thereto compressed air, and a reducing valve in each partition for admitting air at substantially constant pressure from the said compressed air containing compartment to the other compartments.

In testimony whereof I affix my signature.

ARNO BOERNER.